Figure 1:
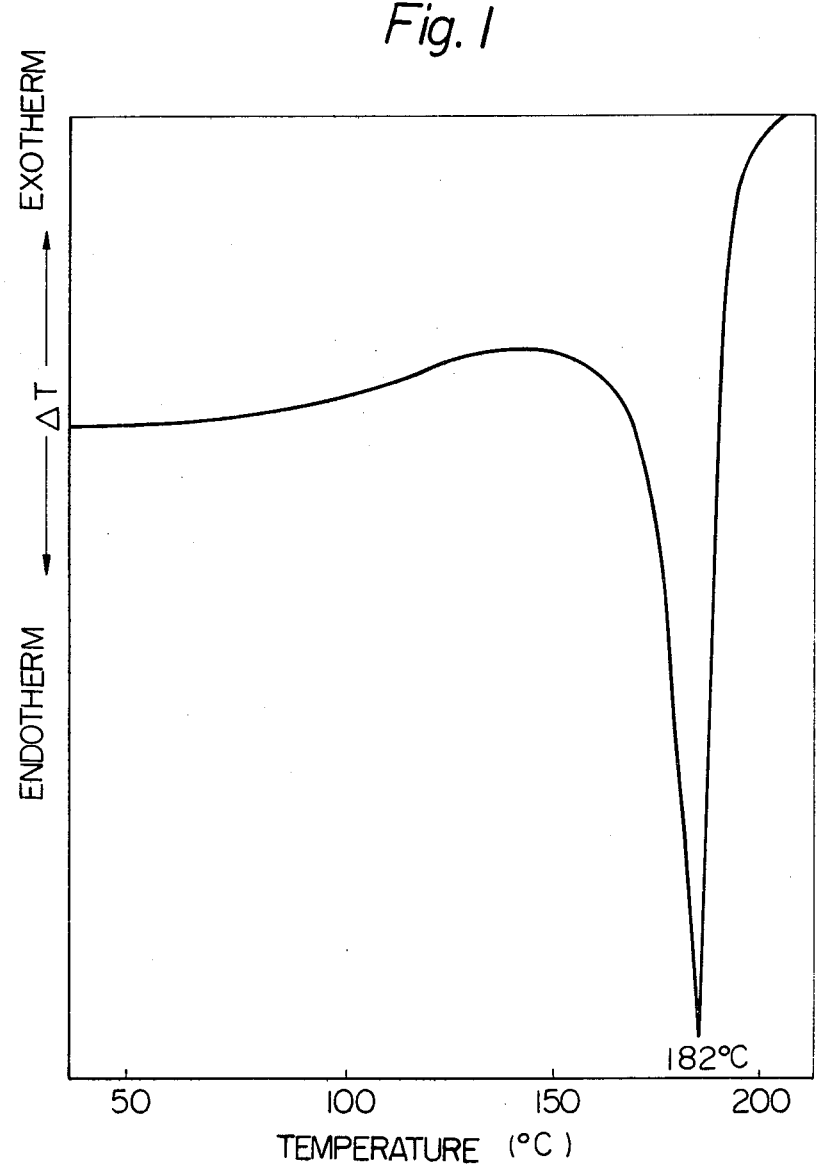

United States Patent [19]

Yamada et al.

[11] 4,082,854
[45] Apr. 4, 1978

[54] PACKAGING MATERIALS HAVING EXCELLENT GAS PERMEATION RESISTANCE AND PROCESS FOR PREPARATION THEREOF

[75] Inventors: Muneki Yamada, Ebina; Sadao Hirata, Yokohama; Akira Kishimoto, Yokohama; Shunsaku Hirata, Yokohama; Toru Suzuki, Yokosuka; Fumio Kano, Kamakurashidai, all of Japan

[73] Assignee: Toyo Seikan Kaisha Limited, Tokyo, Japan

[21] Appl. No.: 660,003

[22] Filed: Feb. 23, 1976

[30] Foreign Application Priority Data

Mar. 3, 1975 United Kingdom ............... 8809/75

[51] Int. Cl.$^2$ ............... B65D 85/00; C08G 41/04; B32B 27/08
[52] U.S. Cl. ............... 426/106; 215/1 C; 264/241; 426/127; 428/35; 428/425; 428/474; 428/483; 428/518; 428/519; 428/520; 428/521; 428/522
[58] Field of Search ............... 428/518, 474, 483, 519, 428/520, 521, 522, 35, 425; 426/106, 127; 215/1 C; 526/8, 11, 10; 264/241

[56] References Cited

U.S. PATENT DOCUMENTS

| | | | |
|---|---|---|---|
| 3,595,740 | 7/1971 | Gerou | 428/474 |
| 3,847,728 | 11/1974 | Hirata | 428/518 |
| 3,931,449 | 1/1976 | Hirata | 428/474 |
| 3,932,692 | 1/1976 | Hirata | 428/474 |

*Primary Examiner*—Ellis Robinson
*Attorney, Agent, or Firm*—Diller, Brown, Ramik & Wight

[57] ABSTRACT

A packaging material having an improved gas permeation resistance, which comprises at least one layer composed of (A) an ethylene-vinyl alcohol copolymer having a vinyl alcohol content of 50 to 75 mole % and a residual vinyl ester content of up to 4 mole % based on the sum of the vinyl alcohol and vinyl ester or (B) a blend of said ethylene-vinyl alcohol copolymer with up to 150% by weight, based on said copolymer, of at least one thermoplastic polymer other than said copolymer, said ethylenevinyl alcohol copolymer having a main endothermic peak satisfying substantially the following requirement:

$$Y_1 = 1.64X + 68.0$$

wherein $Y_1$ stands for the main endothermic peak temperature (° C.) in the differential thermal analysis, and X stands for the vinyl alcohol content (mole %) in the ethylene-vinyl alcohol copolymer, and at least one subsidary endothermic peak satisfying substantially the following requirement:

$$0.67 X + 76.7 \geq Y_2 \geq 0.40 X + 40.0$$

preferably $$0.67 X + 76.7 \geq Y_2 \geq 0.34 X + 88.0$$

wherein $Y_2$ stands for the subsidiary endothermic peak temperature (° C.) in the differential thermal analysis, and X is as defined above, the ratio (Rs) of the subsidiary endothermic peak area to the main endothermic peak area being at least 2.5%.

14 Claims, 2 Drawing Figures

PACKAGING MATERIALS HAVING EXCELLENT GAS PERMEATION RESISTANCE AND PROCESS FOR PREPARATION THEREOF

This invention relates to a packaging material having an excellent gas permeation resistance and a process for the preparation of such packaging material.

More particularly, the invention relates to a packaging material having an improved gas permeation resistance which comprises at least one layer composed of an ethylene-vinyl alcohol copolymer or a blend of said copolymer and at least one thermoplastic polymer, wherein said ethylene-vinyl alcohol copolymer has at least two thermal melting points (at least two melting endothermic peaks in the differential thermal analysis curve), and to a process for the preparation of such packaging material.

As is disclosed in, for example, the specification of U.S. Pat. No. 3,419,654, it is known that an ethylene-vinyl alcohol copolymer is a thermoplastic polymer which can be melt-extruded and has an excellent gas permeation resistance. When this ethylene-vinyl alcohol copolymer is used as a packaging material such as a film, in order to improve defects of this polymer, namely a high water vapor permeability and a poor adaptability to molding into a film or the like, as is taught in the specification of British Pat. No. 1,190,018, the distribution range of ethylene content is narrowed in the ethylene-vinyl alcohol copolymer and the amount of an ethylene homopolymer or vinyl alcohol homopolymer present in the ethylene-vinyl alcohol copolymer is reduced. The method for measuring most simply and conveniently the olefin distribution range in an olefin-vinyl alcohol copolymer and the amount of an olefin homopolymer or vinyl alcohol homopolymer present in the copolymer is the differential thermal analysis method. The above-mentioned British Patent specification teaches an ethylene-vinyl alcohol copolymer having a single endothermic peak in the differential thermal analysis curve and a half-value width of the endothermic peak within a specific temperature range should be chosen as a packaging material.

The invention of the above British Patent is sufficient in that a packaging material composed of an ethylene-vinyl alcohol copolymer having an improved permeation resistance to gases such as oxygen and water vapor and a high melt-moldability can be provided. However, in view of the industrial viewpoint, this prior art is still insufficient because special cares and considerations should be made to obtain a specific ethylene-vinyl alcohol copolymer having a very narrow ethylene distribution range and including a very small amount of an ethylene homopolymer or vinyl alcohol present in the copolymer.

As a result of our research works made with a view to developing an excellent packaging material, we found that contrary to the teachings of the above-mentioned prior art, a packaging material composed of an ethylene-vinyl alcohol copolymer having a main endothermic peak and a subsidary endothermic peak within specific temperature ranges in the differential thermal analysis curve, which vary depending on the vinyl alcohol content in the ethylene-vinyl alcohol copolymer, has an improved gas permeation resistance over a conventional packaging material composed of an ethylene-vinyl alcohol copolymer having a single endothermic peak in the differential thermal analysis curve. Based on this finding, we have now completed this invention.

In accordance with this invention, there is provided a packaging material having an improved gas permeation resistance, which comprises at least one layer composed of (A) an ethylene-vinyl alcohol copolymer having a vinyl alcohol content of 50 to 75 mole % and a residual vinyl ester content of up to 4 mole % based on the sum of the vinyl alcohol and vinyl ester or (B) a blend of said ethylene-vinyl alcohol copolymer with up to 150% by weight, based on said copolymer, of at least one thermoplastic polymer other than said copolymer, said ethylene-vinyl alcohol copolymer having a main endothermic peak satisfying substantially the following requirement:

$$Y_1 = 1.64X + 68.0$$

wherein $Y_1$ stands for the main endothermic peak temperature (° C.) in the differential thermal analysis, and X stands for the vinyl alcohol content (mole %) in the ethylene-vinyl alcohol copolymer,
and at least one subsidary endothermic peak satisfying substantially the following requirement:

$$0.67 X + 76.7 \geq Y_2 \geq 0.40 X + 40.0$$

preferably $$0.67 X + 76.7 \geq Y_2 \geq 0.34 X + 88.0$$

wherein $Y_2$ stands for the subsidary endothermic peak temperature (° C.) in the differential thermal analysis, and X is as defined above,
the ratio (Rs) of the subsidary endothermic peak area to the main endothermic peak area being at least 2.5%.

In accordance with this invention, there is also provided a process for the preparation of packaging materials which comprises the steps of (1) forming a molded structure comprising at least one layer composed of (A) an ethylene-vinyl alcohol copolymer having a vinyl alcohol content of 50 to 75 mole % and a residual vinyl ester content of up to 4 mole % based on the sum of the vinyl alcohol and vinyl ester or (B) a blend of said copolymer with up to 150% by weight, based on said copolymer, of at least one thermoplastic polymer other than said copolymer, and (2) maintaining the so formed molded structure under temperature and time conditions satisfying the following requirements:

$$0.67 X + 66.7 \geq Y_3 \geq 0.40 X + 30.0$$

preferably $$0.67 X + 66.7 \geq Y_3 \geq 0.34 X + 78.0$$

wherein $Y_3$ stands for the heat treatment temperature (°C.) and X stands for the vinyl alcohol content (mole %) in the ethylene-vinyl alcohol copolymer,
and $$t \geq 0.5 X - 20$$

wherein $t$ stands for the heat treatment time (minute) and X is as defined above.

This invention will now be described in detail.

The ethylene-vinyl alcohol copolymer to be used in this invention includes saponified copolymers of ethylene with a lower fatty acid vinyl ester such as vinyl formate, vinyl acetate and vinyl propionate, especially saponified ethylene-vinyl acetate copolymers. These copolymers are detailed in, for example, the specifications of U.S. Pat. No. 3,183,203 and U.S. Pat. No. 3,419,654.

In this invention, it is important that the ethylene-vinyl alcohol copolymer should have a vinyl alcohol content of 50 to 75 mole %, namely an ethylene content of 25 to 50 mole %. In case the vinyl alcohol content is lower than 50 mole %, even if the copolymer has at least two endothermic peaks, the permeability of oxygen or other gas is high and a high gas permeation resistance cannot be obtained. Therefore, the objects of this invention cannot be attained if an ethylene-vinyl alcohol copolymer having such a low vinyl alcohol content is used. In case the vinyl alcohol content in the copolymer exceeds 75 mole %, the hydrophilic characteristics of the copolymer increase and the water vapor permeability is heightened, and further, the melt-modability is reduced. Therefore, an ethylene-vinyl alcohol copolymer having such a high vinyl alcohol content is not suitable for attaining the objects of this invention.

The degree of saponification in the copolymer has important influences on the oxygen permeation resistance of the final packaging material. In this invention, it is important that the ethylene-vinyl alcohol copolymer should be one obtained by saponifying at least 96%, preferably at least 99 mole %, of vinyl ester units of an ethylene-vinyl ester copolymer. In other words, in order to obtain a packaging material having a high gas permeation resistance, it is important that in the ethylene-vinyl alcohol copolymer to be used in this invention, the residual vinyl ester content should be up to 4 mole %, preferably up to 1 mole %, based on the sum of the vinyl alcohol and vinyl ester.

The ethylene-vinyl alcohol copolymer to be used in this invention may be saponified olefin-ethylene-vinyl ester copolymer which comprises as a comonomer a copolymerizable olefin of 3 or 4 carbon atoms such as propylene, butylene-1 and isobutylene in an amount having no bad influences on the resistance of permeation of gases such as oxygen and carbon dioxide gas, for example, in an amount of up to 3 mole %, as far as the above-mentioned requirements of the vinyl alcohol content and the degree of saponification are satisfied.

The molecular weight is not particularly critical in the ethylene-vinyl alcohol copolymer to be used in this invention, but it is generally sufficient that the copolymer has a film-forming molecular weight. The intrinsic viscosity [η] of an ethylene-vinyl alcohol copolymer is generally measured in a mixed solvent comprising, for example, 85% by weight of phenol and 15% by weight of water at 30° C. In this invention, it is preferred to use an ethylene-vinyl alcohol copolymer having an intrinsic viscosity [η], as measured according to this method, of 0.07 to 0.17 l/g.

The ethylene-vinyl alcohol copolymer constituting the packaging material of this invention is characterized in that it has in the differential thermal analysis curve a main endothermic peak and a secondary endothermic peak within specific temperature ranges, which vary depending on the vinyl alcohol content in the copolymer. More specifically, the ethylene-vinyl alcohol copolymer is characterized in that it has in the differential thermal analysis curve a main endothermic peak satisfying the following requirement:

$$Y_1 = 1.64 X + 68.0$$

wherein $Y_1$ stands for the main endothermic peak temperature (° C.) in the differential thermal analysis curve, and X stands for the vinyl alcohol content (mole %) in the ethylene-vinyl alcohol copolymer, and at least one subsidary endothermic peak satisfying the following requirement:

$$0.67 X + 76.7 \geq Y_2 \geq 0.40 X + 40$$

preferably $$0.67 X + 76.7 = Y_2 = 0.34 X + 88.0$$

wherein $Y_2$ stands for the subsidary endothermic peak temperature (° C.) in the differential thermal analysis curve, and X is as defined above.

Figure 2:
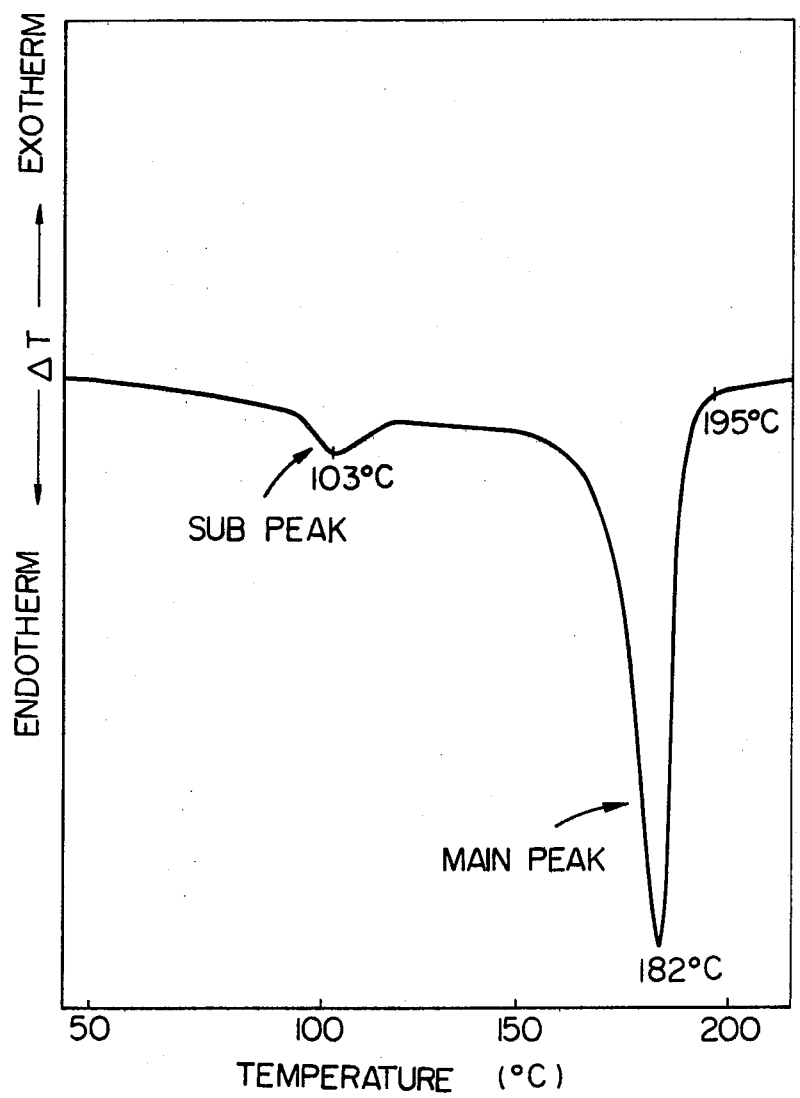

For better illustration, this invention will now be described by reference to the accompanying drawings, in which:

FIG. 1 is a differential thermal analysis curve of a molded article of an ethylene-vinyl alcohol copolymer having a single melting endothermic peak, which is outside the scope of this invention; and FIG. 2 is a differential thermal analysis curve of a molded article of an ethylene-vinyl alcohol copolymer having a plurality of melting endothermic peaks, which is included in the scope of this invention.

A molded article of an ethylene-vinyl alcohol copolymer of this invention having a plurality of endothermic peaks as shown in FIG. 2 has a much improved oxygen permeation resistance (oxygen barrier property over a molded article of an ethylene-vinyl alcohol copolymer having a single endothermic peak as shown in FIG. 1. This fact will be apparent from Table 1 of Example 1 given hereinafter. More specifically, a molded article having a single endothermic peak at 182° C. has an oxygen permeability of 1.14 cc/m².day.atm, whereas a molded article having a main endothermic peak at 182° C. and a subsidary endothermic peak at 103° C. has an oxygen permeability of 0.56 cc/m².day.atm, which is less than the half of the valve of the above molded article having a single endothermic peak (the comparison was made on samples having a thickness of 103 μ).

In the ethylene-vinyl alcohol copolymer constituting the packaging material of this invention, the main endothermic peak is apparently owing to melting of the ethylene-vinyl alcohol copolymer, and in view of the fact that the subsidary endothermic peak appears in a temperature region lower than the temperature at the rising skirt portion of the main endothermic peak area on the lower temperature side and for the reason detailed below, it is believed that this subsidary endothermic peak is owing to melting of the homopolyethylene or polymer chain of ethylene-rich segments present in the ethylene-vinyl alcohol copolymer. Accordingly, it is considered that in the packaging material in this invention, the gas permeation resistance is improved as a result of crystallization of the homopolyethylene portion or ethylene-rich segments present in the ethylene-vinyl alcohol copolymer.

The endothermic peak area in the differential thermal analysis curve (DTA curve) corresponds generally to the heat for melting of crystals of a polymer. In this invention, in order to attain a good gas permeation resistance in the packaging material, it is important that in the ethylene-vinyl alcohol copolymer constituting the packaging material, the area ratio (Rs) represented by the following formula:

Rs = area of subsidiary endothermic peak/area of main endothermic peak × 100 should be at least 2.5%, preferably within a range of 3 to 20%. The criticality of this requirement will be apparent from Table 2 of Example 2 given hereinafter.

The specification of above-mentioned British Pat. No. 1,190,018 teaches that an endothermic peak appearing on the lower temperature side of the endothermic peak formed by melting of the ethylene-vinyl alcohol copolymer is owing to melting of the ethylene homopolymer or the ethylene-rich macromolecular chain, and it is deemed that this theoretical consideration applies to this invention as well. However, said specification teaches that a packaging material of an ethylene-vinyl alcohol copolymer including such ethylene homopolymer or ethylene-rich macromolecular chain, namely a packaging material composed of an ethylene-vinyl alcohol copolymer having a plurality of endothermic peaks, has a poor gas permeation resistance (poor gas barrier property). In contrast, in the packaging material of this invention, the gas permeation resistance is further improved definitely over a packaging material composed of an ethylene-vinyl alcohol copolymer having no subsidary endothermic peak, by crystallizing such ethylene homopolymer or ethylene-rich polymer chain so that a definite subsidiary endothermic peak appears in the differential thermal analysis curve.

It is known in the art that an oxygen permeation coefficient (P, cc/cm.sec.cmHg) of polyethylene can be controlled to a low level by improving the degree of crystallization, namely the density. For example, according to Yukio Ito, Polymer Chemistry, 16, 207 (1959) and A. W. Myers, C. E. Rogers, V. Stannett & M. Szwayz, Tappi, 41, 716 (1958), it is proposed that the oxygen permeation coefficient (P) of polyethylene is represented by the following formula:

$$P = P_a X_a{}^n (\div 2.2)$$

wherein Pa denotes an oxygen permeation coefficient (cc/cm.sec.cmHg) of the amorphous portion in polyethylene, and Xa stands for the volume percent of the amorphous portion.

According to Szwarz et al or Ito, the oxygen gas permeation coefficient ($PO_2$) of polyethylene is calculated as follows:

$$PO_2 \div 1 \times 10^{-10} \text{ cc/cm.sec.cmHg (at 25° C.)}$$

According to our measurement, it was found that an oxygen gas permeation coefficient ($PO_2$) of the ethylene-vinyl alcohol copolymer to be used in this invention (having an ethylene content of 30 mole %) is as follows:

$$PO_2 \div 1 \times 10^{-13} \text{ cc/cm sec cmHg (at 37° C. in the absolutely dry state)}$$

Thus, the oxygen permeation coefficient of polyethylene is about $10^3$ times as high as that of the ethylene-vinyl alcohol copolymer. Therefore, it cannot be expected at all that even if the ethylene homopolymer or ethylene-rich polymer chain present in an ethylene-vinyl alcohol copolymer be crystallized, the oxygen permeation resistance would be substantially improved. Nevertheless, as detailed hereinabove, in the packaging material of this invention, the oxygen permeation resistance can be conspicuously improved by using an ethylene-vinyl alcohol copolymer having a definite subsidary endothermic peak as well as the main endothermic peak. This finding is quite surprising in view of the above-mentioned fact.

The packaging material of this invention may be composed of either the above-mentioned ethylene-vinyl alcohol copolymer alone or a blend of said copolymer with up to 150% by weight, preferably up to 120% by weight, based on said copolymer, of at least one thermoplastic polymer other than said copolymer. Further, the packaging material of this invention may have either a single layer structure composed of said ethylene-vinyl alcohol copolymer or its blend with other thermoplastic polymer or a multi-layer molded structure or laminate structure comprising at least one layer of said copolymer or its blend and at least one layer of other thermoplastic resin. The packaging material of this invention can take, for example, a form of a single-layer or multi-layer film, bottle, bag, squeeze container, tube, tank or other vessel.

Any of thermoplastic polymers that can be kneaded with an ethylene-vinyl alcohol copolymer and can be melt-molded into a film can be used as the thermplastic polymer to be blended with the ethylene-vinyl alcohol copolymer to be used in this invention. For example, suitable thermoplastic polymers are chosen from olefin polymers and thermoplastic polymers containing at least one kind of a polar group selected from carbonyl, hydroxyl and other groups and they are used singly or in combination. Specific examples of suitable thermoplastic polymers to be blended with the ethylene-vinyl alcohol copolymer are now mentioned:

(1) Olefin polymers:

Low density polyethylene, medium density polyethylene, high density polyethylene, polypropylene, ethylene-propylene copolymers, polybutene-1, polypentene-1 and poly-4-methylpentene-1.

(2) Thermoplastic polymers containing at least one kind of a polar group selected group carbon, hydroxyl and ether groups:

As the carbonyl group-containing thermoplastic polymer, there are preferably employed thermoplastic polymers containing 120 to 1400 meq/100 g of the polymer, especially 150 to 1200 meq/100 g of the polymer, of carbonyl groups derived from carboxylic acids, carboxylic acid salts, carboxylic anhydrides, carboxylic acid esters, carboxylic acid amides, carbonic acid esters, urea or urethane. These polymers may contain ether or hydroxyl groups in addition to carbonyl groups. Preferred examples of such carbonyl group-containing thermoplastic copolymers are disclosed in the specification of British Patent Application No. 28395/72. For instance, there can be mentioned ethylene-acrylic acid copolymers, maleic anhydride-modified polypropylene, acrylic acid ester-grafted polyethylenes, ethylenevinyl acetate copolymers, ionomers, partially saponified ethylene-vinyl acetate copolymers having a degree of saponification of 20 to 75%, said partially saponified copolymers grafted with acrylic acid or maleic acid, polybutylene terephthalate, polybutylene terephthalate/polyteramethylene oxide block copolymers, polyethylene terephthalate, polylauryl lactam, polycaprolactam and the like.

In this invention, a blend of the above-mentioned ethylene-vinyl alcohol copolymer with at least one thermoplastic polymer selected from olefin polymers and carbonyl group-containing thermoplastic polymers is advantageous in that the above-mentioned excellent oxygen permeation resistance inherent of the ethylene-vinyl alcohol copolymer is manifested and when a multilayer molded structure is prepared by co-extruding this blend and a polyolefin, a bondage excellent in the interlaminar peel resistance can be attained between the blend layer and the polyolefin layer. If an ethylene-vinyl alcohol copolymer, a polyolefin and a carbonyl group-containing thermoplastic polymer are designated as EV, PO and C, respectively, blends especially suitable for attaining the objects of this invention are as follows:

(1) A blend in which the EV : PO weight ratio is within a range of from 100 : 25 to 100 : 100.

(2) A blend in which the EV : C weight ratio is within a range of from 100 : 25 to 100 : 100.

(3) A blend in which the EV : PO : C weight ratio is within a range of from 100 : 25 : 4 to 100 : 100 : 20.

(4) A blend in which the EV : $(C_1 + C_2 + \ldots + C_n)$ weight ratio (in which $C_1, C_2, \ldots C_n$ stand for different kinds of carbonyl group-containing polymers) is within a range of from 100 : 25 to 100 : 100.

(5) A blend in which the EV : $(PO_1 + PO_2 + \ldots + PO_m)$ weight ratio (in which $PO_1, PO_2, \ldots PO_m$ stand for different kinds of polyolefins) is within a range from 100 : 25 to 100 : 100.

(6) A blend in which the EV : $(PO_1 + PO_2 + \ldots + PO_m) : (C_1 + C_2 + \ldots + C_n)$ weight ratio (in which $PO_1, PO_2, \ldots PO_m$ and $C_1, C_2, \ldots C_n$ are as defined above) is within a range of from 100 : 25 : 4 to 100 : 100 : 20.

In the case of a packaging material having a multilayer molded structure or a laminate structure, a layer of the ethylene-vinyl alcohol copolymer or its blend may be an intermediate layer or an outer or inner surface layer of the packaging material. In general, in order to prevent the moisture or humidity from adversely affecting the oxygen barrier property of the ethylene-vinyl alcohol copolymer, it is preferred that the layer of the ethylene-vinyl alcohol copolymer or its blend be an intermediate layer. In this case, it is preferred to use as the surface-layer constituting material a thermoplastic polymer which has a water absorption lower than 3.5%, especially lower than 2.5%, when it has been allowed to stand in an atmosphere of a temperature of 23° C. and a relative humidity of 50% for 5 days. As such thermoplastic polymer, there can be mentioned, for example, polyolefins such as polyethylene and polypropylene, polyesters such as polyethylene terephthalate and polybutylene terephthalate, polycarbonates, polyamides, and nitrile resins such as acrylonitrile-styrene-butadiene copolymers, methylmethacrylate-grafted acrylonitrile-styrene-butadiene copolymers, methyl methacrylate-grafted acrylonitrile-butadiene copolymers and methyl methacrylate-grafted acrylonitrile-styrene copolymers.

Since it is generally difficult to bond a layer composed of an ethylene-vinyl alcohol copolymer alone directly to a layer of such thermoplastic polymer of a low water absorption as mentioned above, e.g., polyolefin, it is preferred to bond these two layers with an isocyanate type adhesive or epoxy type adhesive, extrude an intermediate layer of and ethylene-acrylic acid copolymer, an adhesive polyester or a carbonyl group-containing thermoplastic polymer such as an ionomer between both the layers when the two layers are formed by the co-melt-extrusion technique, or blend in advance a small amount of a carbonyl group-containing thermoplastic polymer such as mentioned above into a layer of the thermoplastic polymer of a low water absorption such as polyolefin.

Further, in the case of a heat-sealable multilayer film, bag or squeeze container, there may preferably be adopted a structure comprising a low density polyethylene as the inner surface layer to be heatsealed and an outer surface layer composed of a thermoplastic polymer having a melting point higher than that of the low density polyethylene, such as polypropylene, polyesters, polyamides and the like. Suitable layer combinations in the multi-layer molded structure or laminate structure include polyolefin/ethylene-vinyl alcohol copolymer/polyolefin, polyolefin/ethylene-vinyl alcohol copolymer blend/polyolefin and polyolefin/blend/ethylene-vinyl alcohol copolymer/blend/polyolefin.

Moreover, in order to impart to the multi-layer molded structure or laminate structure having such layer combination other physical and chemical properties such as pressure resistance and heat resistance, it is possible to form by the co-melt-extrusion technique a layer of a thermoplastic resin such as (1) a polyester, e.g., polyethylene terephthalate and polybutylene terephthalate, (2) a polypropylene, (3) a polycarbonate, (4) a methylmethacrylate-grafted acrylonitrile-styrene copolymer, methyl methacrylate-grafted acrylonitrile-butadiene copolymer or methyl methacrylate-grafted acrylonitrile-styrene-butadiene copolymer, (5) an acrylonitrile-styrene-butadiene copolymer and (6) a polymethyl methacrylate.

The packaging material of this invention can take a form of a multi-layer structure which is different from an ordinary laminate structure or a co-extruded multilayer structure molded by using a multi-ply die. For example, as is illustrated in the specification of our copending British Patent Applications No. 26835/72, No. 28395/72, No. 39091/73 and No. 39249/73, when a mixture of a melt of an ethylene-vinyl alcohol copolymer and a melt of a polyolefin or its blend with a carbonyl group-containing thermoplastic polymer is melt-extruded under such conditions that the resin melt passes through a resin passage of a die in the form of a laminar flow and the difference of the average flow rate between the ethylene-vinyl alcohol copolymer melt of the polyolefin or its blend is at least 1 cm/sec, a multilayer molded structure in which the resin composition is changed in the direction of the thickness of the molded structure but is substantially uniform in the plane direction of the molded structure is obtained. This molded structure is very useful for the packaging material of this invention.

In preparing the packaging material of this invention, a molded structure comprising at least one layer composed of (A) an ethylene-vinyl alcohol copolymer having a vinyl alcohol content of 50 to 75 mole % and a residual vinyl ester content of up to 4 mole % or (B) a blend of said copolymer with up to 150% by weight, based on said copolymer, of at least one thermoplastic polymer other than said copolymer is first formed by melt molding or other known molding means. For example, a packaging film is prepared according to extrusion molding, press molding, calender molding, cast molding or other known molding means. A bottle or other vessel is prepared according to blow molding, injection molding, extrusion molding, cast molding or other known molding means. A squeeze container is prepared by, for example, vacuum molding a once molded film or sheet into a desired form, and a bag-like container is prepared by molding a once formed film or sheet into a bag-like form by heat sealing or bonding.

A packaging container having a multi-layer structure is prepared according to extrusion molding, blow molding or injection molding by using extruders of a number corresponding to the number of resin layers and co-extruding these resin flows from the extruders with use of a multiply die. Further, a multi-layer molded structure can be formed by using one extruder and extruding an ethylene-vinyl alcohol copolymer-containing blend under the above-mentioned specific conditions.

Still further, a multi-layer laminate structure especially a laminate film, can be prepared according to a known laminating technique such as sp-called dry lamination, extrusion coating, extrusion lamination and hot melt lamination.

According to this invention, the so formed molded structure is maintained under the temperature and time conditions represented by the following formulae:

$$0.67 X + 66.7 \geq Y_3 \geq 0.40 X + 30.0$$

preferably $$0.67 X + 66.7 \geq Y_3 \geq 0.40 X + 30.0$$

wherein $Y_3$ stands for the heat treatment temperature (°C.), and X designates the vinyl alcohol content (mole %) in the ethylene-vinyl alcohol copolymer, and $$t \geq 0.5 X - 20$$

wherein $t$ stands for the heat treatment time (minute) and X is as defined above. By this heat treatment, a packaging material having an improved gas permeation resistance can be obtained.

According to this invention, by heat-treating the above-mentioned molded structure, especially one formed by melt molding, by maintaining it under the above-mentioned specific temperature and time conditions, in the DTA curve of the ethylene-vinyl alcohol copolymer constituting the packaging material, there is caused to appear a subsidary endothermic peak having an area varying depending on the rising temperature corresponding to the heat treatment temperature and the specific heat treatment time, and owing to appearance of this secondary endothermic peak the oxygen permeation resistance is highly improved in the packaging material. If the above-mentioned packaging material is not subjected to this specific heat treatment of this invention, such subsidary endothermic peak does not appear in the DTA curve of the ethylene-vinyl alcohol copolymer, and this packaging material is much inferior to the packaging material of this invention in respect to the oxygen permeation resistance.

Optional means can be adopted for subjecting a packaging material formed by melt molding to the above-mentioned heat treatment. For example, this heat treatment can be performed during the process where the molded structure is cooled to room temperature from the molten state, or it is possible to adopt a method comprising cooling the molded structure to room temperature, elevating the temperature to the above-mentioned specific temperature and maintaining the molded structure at this temperature for a prescribed time. Further, this heat treatment is performed either at one stage or in the multi-staged manner. In case the heat treatment is carried out in the multi-staged manner, as shown in Table 4 given hereinafter, a plurality of subsidary endothermic peaks corresponding to respective heat treatment temperatures appear in the DTA curve. The heat treatment can easily be accomplished by a known heating furnace or gradually cooling furnace provided with a heating mechanism such as an infrared red heater, an electric heater, a steam heater, a hot water heater or a hot air heater. The minimum heat treatment time is closely concerned with the vinyl alcohol content in the ethylene-vinyl alcohol copolymer. In case the vinyl alcohol content (X) is, for example, 50 mole %, the minimum heat treatment time is 5 minutes. In the case of X = 60 mole %, the minimum heat treatment time is 10 minutes and in the case of X = 70 mole %, the minimum heat treatment time is 15 minutes. Since it is disadvantageous from the industrial viewpoint that this heat treatment time (t) exceeds 30 minutes. Therefore, it is preferred that suitable heat treatment conditions be so chosen that the heat treatment time (t) is within a range of from such minimum heat treatment time to about 30 minutes and a highest oxygen permeation resistance is obtained. It is possible to adopt, instead of such particular heat treatment, a method in which a liquid content maintained within the above temperature range is filled in the molded packaging material and this temperature is kept for a prescribed time, or a method in which a content-filled packaging material is subjected to the heat sterilization treatment at said temperature for said time to thereby attain the same effects as by the above heat treatment. Since it is believed that this heat treatment is for crystallizing the homopolyethylene or ethylene-rich segments in the ethylene-vinyl alcohol copolymer, the intended effects can be attained by ultraviolet irradiation or electron beam irradiation, and in this case the treatment time can be made much shorter than the above-mentioned heat treatment time.

It is known in the art that a film of an ethylene-vinyl alcohol copolymer or the like is subjected to a heat treatment. Such known heat treatment, however, is different from the heat treatment of this invention with respect to the conditions and the objects. For example, the specification of U.S. Pat. No. 3,560,325 discloses that a laminate film of an ethylene-vinyl alcohol copolymer and a polyolefin is heat-treated under specific conditions to overcome the defect of this film that the boundary portion between the heat-sealed area and the non-heat-sealed area is very weak to vibration or shock. This heat treatment is performed for a relatively short time, namely shorter than 1 minute, and the heat treatment temperature is relatively high. Under such heat treatment conditions, as shown in Tables given in Examples, it is impossible to obtain a packaging material having improved oxygen permeation resistance and thermal characteristics as specified in this invention.

Further, Japanese Laid-Open Patent Application Specification No. 5175/74 discloses a method in which an ethylene-vinyl alcohol copolymer is heat-treated at a specific temperature in water or a mixture of water with an additive such as alcohol or in an atmosphere of a specific relative humidity by using an additive such as alcohol. However, it is not taught at all in this specification that the resistance to permeation of gases such as oxygen would be improved by this heat treatment. Further, in this heat treatment complicated operations are required for adjustment of the humidity and the like, and hence, this heat treatment method is industrially disadvantageous. More specifically, in the case of a multi-layer molded structure including as an intermediate layer an ethylene-vinyl alcohol copolymer, it takes an extraordinarily long time for the copolymer to come to have such specific humidity, and industrial practise of this heat treatment method is substantially impossible. In contrast, in the heat treatment of this invention it is quite unnecessary to use water or an additive as disclosed in said specification, and the heat treatment can be accomplished very easily in this invention.

The packaging material of this invention has not only an advantage that the gas permeation resistance, especially the oxygen permeation resistance, is very high, but also other many advantages in connection with the preparation thereof. For example, according to this invention, by using an industrially easily available ethylene-vinyl alcohol copolymer in which ethylene has a relatively broad distribution, a packaging material having an improved oxygen permeation resistance can be provided, and this improvement of the oxygen permeation resistance can be accomplished by relatively simple means.

The packaging material of this invention can be used effectively for preserving and storing without deterioration or weight loss liquid, pasty and gelatinous foodstuffs, for example, stews such as pre-cooked curry, pre-cooked hash, borsch and beef stew, gravy such as meat sauce, boiled vegetables, fishes and meats such as vinegared pork, sukiyaki, Chinese food paste of beef and vegetables, Chinese hotchpotch, boiled asparagus and cream-boiled tuna, soups such as consome soup, potage soup, miso soup, pork-incorporated miso soup and vegetable soup cocked with oil, rice foods such as boiled rice, rice boiled with red beans, toasted boiled rice, frizzled boiled rice, pilaff and rice-gruel, noodles such as spaghetti, buck-wheat vermicelli, wheat vermicelli, Chinese noodle and Italian noodle, compound condiments such as those for toasted boiled rice or Chinese noodle soup, luxury foods such as tasted boiled red beans, thick bean-meal soup with sugar and sugared and boiled beans with rice cake or fruits and jelly, processed fish and meat products; drinks, for example, beer, sake, whisky, distilled spirits, fruit wine such as grape wine, alcoholic drinks such as cocktails, carbonated drinks such as coal, cider and plane soda water, fruit juices such as lemon juice, orange juice, plum juice, grape juice, strawberry juice and other straight juices, processed fruit juice drinks such as Nector, vegetable juices such as tomato juices, synthetic drinks such as synthetic fruit juices comprising a saccharide such as sugar or fructose, citric acid, a colorant and perfume optionally with a vitamin, and lactic acid beverages; condiments such as soy, sauce, vinegar, sweet sake, dressing, mayonnaise, ketchup, edible oil, miso and lado; table luxuries such as jam, butter, margarine and bean curd; liquid medicines, agricultural chemicals, cosmetics and detergents; ketones such as acetone and methylethylketone; aliphatic hydrocarbons such as n-hexane and n-heptane; aromatic hydrocarbons such as benzene, toluene and xylene; chlorine-containing compounds such as carbon tetrachloride and tetrachloroethylene; higher fatty acids; and gasoline, kerosene, petroleum benzine, fuel oil, thinner, grease, silicone oil, light oil and machine oil.

This invention will now be described in detail by reference to the following Examples, in which the differential thermal analysis was conducted on 5 to 10 mg of a sample at a temperature-elevating rate of 10° C./min by using a micro-sample type differential thermal analysis apparatus manufactured by Rigaku-Denki Co. Ltd. (Micro DTA Standard Model No. 8025). In each of the Examples, the oxygen gas permeability was determined according to the following method:

(1) Bottles:

Nitrogen gas was introduced into an evacuated sample bottle to be tested, and an opening of the bottle was sealed with a rubber plug. Contacting surface portions of the opening and rubber plug were coated with an epoxy adhesive, and the bottle was kept for a prescribed period in a thermostat tank maintained at a temperature of 37° C. and a relative humidity of 15%. Then, the concentration of oxygen, which had permeated into the bottle, was determined by the gas chromatography, and the oxygen gas permeability $QO_2$ was calculated according to the following equation. Each value given in the Examples is a mean value obtained by conducting this test with respect to three samples.

$$QO_2 = \frac{m \times \frac{Ct}{100}}{t \times Op \times A} \ (cc/m^2 \cdot day \cdot atm)$$

wherein $m$ is an amount (cc) of nitrogen gas filled in the bottle, $t$ is a period (day) during which the bottle was kept in the thermostat tank, Ct is an oxygen concentration (% by volume) in the bottle after the passage of $t$ days, A is an effective surface area ($m^2$) of the bottle, and Op is a partial pressure (atm) of oxygen (0.209).

(2) Films:

The oxygen gas permeability was determined by using a gas permeation tester when a sample to be tested was a film. More specifically, the sample was fixed between two chambers of the tester. In one chamber (low pressure chamber), the pressure was reduced by suction to a pressure lower than $10^{-2}$ mmHg, and the atmosphere of the other chamber (high pressure chamber) was replaced with oxygen so that its pressure was 1 atmosphere. The increase of the pressure with the lapse of the time in the low pressure chamber was read by a recorder, and the oxygen permeability $QO_2$ was calculated based on recorded data. The measurement temperature was 37° C. and the relative humidity in the high pressure chamber was 0%. Each value given in the Examples is a mean value obtained by conducting this test with respect to three samples.

EXAMPLE 1

An ethylene-vinyl alcohol copolymer having a vinyl alcohol content of 73.8 mole %, a residual vinyl acetate content of 0.8 mole %, an intrinsic viscosity of 0.12 l/g as measured in a mixed solvent of 85% by weight of phenol and 15% by weight of water at 30° C., a density of 1.19 g/cc as measured at 23° C. and a melt index of 1.3 g/10 min as measured at 190° C. was molten at 200° C., pressed by a high-pressure oil pressure press (gauge pressure of 20 Kg/cm²) and immediately allowed to stand at room temperature to cool the resulting film. Thus was obtained a film A having a thickness of 103 $\mu$. Separately, just after pressing, the sample was heat-treated for 15 minutes in an atmosphere maintained at 105° C. and then allowed to stand still at room temperature to cool it. Thus was obtained a film B having a thickness of 105 $\mu$. In the same manner as described above, just after pressing, samples were heat-treated for 15 minutes at 60°, 80°, 100°, 120° or 140° C. to obtain films C, D, E, F and G.

Each of the above sample films A to G was subjected to the differential thermal analysis, the oxygen gas permeability measurement and the water vapor permeability measurement according to JIS Z-0208 (as calculated as 104 μ thickness) to obtain results shown in Table 1.

when 5 hours had passed from the start of film formation. The film was wound and naturally cooled to room temperature. A film of a thickness of about 200 μ prepared just after the start of film formation was designated as sample 1, and a film of a thickness of about 200

Table 1

| Sample | Heat Treatment Temperature (° C.) | Heat Treatment Time (minutes) | Film Thickness (μ) | Main Endothermic Peak Temperature* (° C.) | Subsidary Endothermic Peak Temperature* (° C.) | Subsidary Endotherm-Appearing Temperature* (° C.) | Rs(%) | Oxygen Permeability** (cc/m²·day·atm) | WVTR*** (g/m²·day·104μ) |
|---|---|---|---|---|---|---|---|---|---|
| A | not heat treated | 0 | 103 | 182 | none | none | 0 | 1.14 | 46.2 |
| B | 105 | 15 | 105 | 182 | 110 | 103 | 5.1 | 0.55 | 41.0 |
| C | 60 | 15 | 102 | 181 | 67 | 60 | 2.9 | 0.68 | 44.6 |
| D | 80 | 15 | 101 | 183 | 89 | 80 | 3.6 | 0.61 | |
| E | 100 | 15 | 103 | 181 | 103 | 97 | 5.2 | 0.56 | |
| F | 120 | 15 | 101 | 182 | 130 | 122 | 4.1 | 0.60 | |
| G | 140 | 15 | 104 | 183 | 148 | 139 | 4.1 | 0.70 | 46.0 |

Notes:
*temperature-elevating rate = 10° C/min
**measured at 37° C. and RH of 0 %; the value indicates the amount of oxygen permeated per unit area of the sample as measured with respect to thickness indicated above
***water vapor permeability measured according to JIS Z-0208

In the differential thermal anaylsis curve of the sample A, no subsidiary endothermic peak was present, but the main endothermic peak was observed at 182° C. In contrast, in each of the samples B to G, a subsidiary endothermic peak varying depending on the heat treatment temperature and a main endothermic peak deemed identical with that of the sample A within an experimental error (182° ± 1° C.) were observed.

EXAMPLE 2

A film prepared in the same manner as in the case of the sample A of Example 1 was heat-treated for 15 minutes in an atmosphere maintained at 105° C. to obtain a sample H. The same film was heat-treated for 3 minutes in the same atmosphere to obtain a sample EH. A film was prepared in the same manner as in the case of the sample B except that the heat treatment time is shortened to 3 minutes, to obtain a sample EB. These samples H, EH and EB were subjected to the differential thermal analysis and the oxygen permeability measurement to obtain results shown in Table 2, from which it will readily be understood that since in the samples EH and EB the heat treatment time was shorter than in the samples H and B, the ratio of the subsidiary endothermic peak area to the main endothermic peak area in the differential thermal analysis curve was smaller.

μ prepared when 5 hours had passed from the start of film formation was designated as sample J. A film was prepared under the same extrusion conditions above by using a water-cooling roll (the cooling water temperature being about 18° C.), and wound and naturally cooled to room temperature to obtain a sample K of a thickness of about 200 μ. A film prepared under the same extrusion conditions as above was passed through a cooling roll maintained at 105° C. and heat-treated in a thermostat tank at 105° C. for 15 minutes to obtain a sample L of a thickness of about 200 μ. The sample J was heat-treated at 60° C. for 15 minutes to obtain a sample M, and the sample J was heat-treated at 80° C. for 15 minutes to obtain a sample N. Separately, the sample J was heat-treated at 100° C. for 15 minutes to obtain a sample O and the sample J was heat-treated at 120° C. for 15 minutes to obtain a sample P. Further, the sample J was heat-treated at 105° C. for 3 minutes to obtain a sample EJ and the sample J was heat-treated at 105° C. for 15 minutes to obtain a sample PJ.

These samples I, J, K, L, M, N, O, P, EJ and PJ were subjected to the differential thermal analysis and the oxygen permeability measurement to obtain results shown in Table 3.

From the results shown in Table 3, it is seen that samples I, J and K on which the effective heat treatment Table 2

| Example No. | Sample | Heat Treatment Time (minutes) | Film Thickness (μ) | Main Endothermic Peak Temperature* (° C.) | Subsidary Endothermic Peak Temperature* (° C.) | Rs (%) | Oxygen Permeability** (cc/m²·day·atm) |
|---|---|---|---|---|---|---|---|
| 2 | H | 15 | 103 | 182 | 110 | 5.0 | 0.57 |
| 2 | EH | 3 | 102 | 183 | 109 | <1 | 1.14 |
| 1 | B | 15 | 104 | 181 | 110 | 5.1 | 0.55 |
| 2 | EB | 3 | 103 | 182 | 110 | <1 | 1.13 |

Notes:
*same as in Table 1
**same as in Table 1

EXAMPLE 3

The same ethylene-vinyl alcohol copolymer as used in Example 1 was molded into a film by means of an extruder equipped with a nylon type screw having a diameter of 25 mm and a length of 625 mm, and a T-die. The screw rotation number was 65 per minute and the die head temperature was 250° C. The cooling roll used was such that the roll temperature was room temperature at the start of film formation and it was about 75° C.

such as specified in this invention was not conducted had no subsidiary endothermic peaks in the thermal differential analysis curves thereof, and that although a subsidiary endothermic peak was observed in the differential thermal analysis curve of the sample EJ, the ratio of the subsidary endothermic peak area to the main endothermic peak area was small. Further, from comparison of date of the sample L with data of the sample PJ, it is seen that data of endothermic peak temperatures, the peak area ratio and the oxygen permeability were in agreement between the two samples within experimental errors and effects of the heat treatment according to this invention can be manifested with good reproducability even if the heat treatment means differ.

obtain a sample U. The sample I was heat-treated at 120° C. for 5 minutes, naturally cooled to room temperature, heat-treated at 100° C. for 5 minutes, naturally cooled to room temperature and further heat-treated at 80° C. for 5 minutes to obtain a sample ET. The sample I was heat-treated at 120° C. for 5 minutes, immediately Table 3

| Sample | Heat Treatment Temperature (° C.) | Heat Treatment Time (minutes) | Film Thickness (μ) | Main Endothermic Peak Temperature* (° C.) | Subsidary Endothermic Peak Temperature* (° C.) | Subsidary Endotherm-Appearing Temperature* (° C.) | Rs(%) | Oxygen Permeability** (cc/m$^2$·day·atm) |
|---|---|---|---|---|---|---|---|---|
| I | not heat-treated | 0 | 201 | 181 | none | none | 0 | 0.59 |
| J | not heat-treated | 0 | 204 | 181 | none | none | 0 | 0.59 |
| K | not heat-treated | 0 | 203 | 182 | none | none | 0 | 0.58 |
| L | 105 | 15 | 202 | 183 | 111 | 104 | 5.0 | 0.27 |
| M | 60 | 15 | 203 | 182 | 68 | 60 | 2.6 | 0.34 |
| N | 80 | 15 | 201 | 182 | 90 | 80 | 3.4 | 0.31 |
| O | 100 | 15 | 202 | 182 | 105 | 98 | 5.2 | 0.28 |
| P | 120 | 15 | 203 | 181 | 129 | 121 | 4.1 | 0.33 |
| EJ | 105 | 3 | 201 | 182 | 111 | 105 | <1 | 0.58 |
| PJ | 105 | 15 | 199 | 181 | 110 | 104 | 5.3 | 0.27 |

Notes:
*same as in Table 1
**same as in Table 1

EXAMPLE 4

The sample I prepared in Example 3 was heat-treated at 120° C. for 15 minutes and naturally cooled to room temperature, and the treated film was further heat-treated at 105° C. for 15 minutes to obtain a sample Q. The sample I was heat-treated at 120° C. for 5 minutes, naturally cooled to room temperature and further heat-treated at 105° C. for 15 minutes to obtain a sample R. The Sample I was heat-treated at 120° C. for 15 minutes and immediately thereafter, it was further heat-treated at 105° C. for 15 minutes to obtain a sample S. The sample I was heat-treated at 120° C. for 5 minutes, naturally cooled to room temperature and further heat-treated at 105° C. for 5 minutes to obtain a sample EQ. The sample I was heat-treated at 120° C. for 5 minutes and immediately thereafter, it was further heat-treated at 105° C. for 5 minutes to obtain a sample RS. The sample I was heat-treated at 120° C. for 15 minutes, naturally cooled to room temperature, heat-treated at 100° C. for 15 minutes, naturally cooled to room temperature, and further heat-treated at 100° C. for 15 minutes, naturally cooled to room temperature, and further heat-treated at 80° C. for 15 minutes to obtain a sample T. The sample I was heat-treated at 120° C. for 15 minutes, immediately heat-treated at 100° C. for 15 minutes, and immediately heat-treated at 80° C. for 15 minutes to heat-treated at 100° C. for 5 minutes and immediately heat-treated at 80° C. for 5 minutes to obtain a sample RU. The sample I was molten at 200° C. for 5 minutes, immediately heat-treated at 120° C. for 15 minutes, immediately heat-treated at 100° C. for 15 minutes, and immediately further heat-treated at 80° C. for 15 minutes to obtain a sample V. The sample I was molten at 200° C. for 5 minutes, immediately heat-treated at 120° C. for 5 minutes, immediately heat-treated at 100° C. for 5 minutes, and immediately further heat-treated at 80° C. for 5 minutes to obtain a sample RV.

All of the foregoing film samples were subjected to the differential thermal analysis and the oxygen permeability measurement to obtain results shown in Table 4.

This Example illustrates embodiments of the heat treatment for obtaining products having two or three subsidary endothermic peaks. It will readily be understood that the oxygen permeation resistance can be significantly improved by the heat treatment conducted under the conditions specified in this invention regardless of the mode of the heat treatment or the number of the subsidary endothermic peaks.

In each of the foregoing samples, the main endothermic peak temperature of the ethylene-vinyl alcohol copolymer was substantially the same as that observed in samples of Example 3.

Table 4

| Example No. | Sample | Mode of Heat Treatment* | Subsidary Endothermic Peak Temperature** (° C.) | Rs*** (%) | | | | Oxygen Permeability**** (cc/m$^2$·day·atm·200 μ) |
|---|---|---|---|---|---|---|---|---|
| | | | | first | second | third | total | |
| 3 | I | not heat-treated | none | — | — | — | 0 | 0.59 |
| 4 | Q | I-120° C.,15 minutes -RT- 105° C.,15 minutes | 110, 131 | 5.1 | 3.8 | — | 8.9 | 0.28 |
| 4 | EQ | I-120° C.,5 minutes -RT- 105° C., 5 minutes | 108, 130 | <1 | <1 | — | <2 | 0.57 |
| 4 | S | I-120° C.,15 minutes-105° C., 15 minutes | 111, 131 | 5.0 | 3.7 | — | 8.7 | 0.29 |
| 4 | RS | I-120° C.,5 minutes -105° C., 5 minutes | 108, 129 | <1 | <1 | — | <2 | 0.58 |
| 4 | T | I-120° C.,15 minutes -RT-105° C., 15 minutes-RT -80° C.,15 minutes | 90, 110, 130 | 3.1 | 4.9 | 3.0 | 11.0 | 0.25 |
| 4 | ET | I-120° C.,5 minutes -RT-105° C., 5 minutes -RT- 80° C.,5 minutes | 88, 109, 129 | <1 | <1 | <1 | <2.5 | 0.55 |
| 4 | U | I-120° C.,15 minutes -105° C., 15 minutes -80° C.,15 minutes | 90, 111, 131 | 3.0 | 4.8 | 2.9 | 10.7 | 0.26 |
| R | RU | I-120° C.,5 minutes -105° C., 5 minutes -80° C.,5 minutes | 89, 109, 130 | <1 | <1 | <1 | <2.5 | 0.54 |
| 4 | V | I-200° C.,5 minutes -120° C.,15 minutes -105° C.,15 minutes -80° C., 15 minutes | 90, 110, 129 | 3.0 | 4.8 | 3.0 | 10.8 | 0.26 |

Table 4-continued

| Example No. | Sample | Mode of Heat Treatment* | Subsidary Endothermic Peak Temperature** (° C.) | Rs*** (%) first | second | third | total | Oxygen Permeability**** (cc/m² · day · atm · 200 μ) |
|---|---|---|---|---|---|---|---|---|
| 4 | RV | I-200° C.,5 minutes -120° C., 5 minutes -105° C.,5 minutes -80° C., 5 minutes | 88, 109, 129 | <1 | <1 | <1 | <2.5 | 0.55 |

Notes:
*the expression "x — y" means that the treatment x was first conducted and then the treatment y was conducted, and "RT" indicates cooling to room temperature
**measured under the same conditions as in Table 1
***"first", "second" and "third" indicate first, second and third subsidary endothermic peaks counted from the low temperature side, and "total" indicates the sum of areas of the first, second and third endothermic peaks
****as calculated as 200 μ thickness

EXAMPLE 5

An ethylene-vinyl alcohol copolymer having a vinyl alcohol content of 50.6 mole %, a residual vinyl acetate content of 3.7 mole %, and an intrinsic viscosity of 0.09 l/g as measured in a mixed solvent of 85% by weight of phenol and 15% by weight of water at 30° C. was press-molded at 180° C. for 3 minutes by using a high-pressure oil pressure press (the gauge pressure being 50 Kg/cm²), and then cooled naturally to room temperature to obtain a film having a thickness of about 100 μ. The film was designated as sample W. This sample W was heat-treated at 70° C. for 7 minutes to obtain a sample X, and separately, the sample W was heat-treated at 100° C. for 7 minutes to obtain a sample Y. The sample W was heat-treated at 120° C. for 7 minutes to obtain a sample Z, and the sample W was heat-treated at 100° C. for 4 minutes to obtain a sample EY. These samples W, X, Y, Z and EY were subjected to the differential thermal analysis and the oxygen permeability measurement to obtain results shown in Table 5.

There was observed no subsidary endothermic peak in the differential thermal analysis curve of the sample W but only a main endothermic peak was observed at about 150° C. In each of the samples X, Y, Z and EY, a subsidary endothermic peak corresponding to the heat treatment temperature was observed in addition to the main endothermic peak at about 150° C., but in the case of the sample EY, the ratio of the subsidary endothermic peak area to the main endothrmic peak area was not so high as would manifest the effects intended in this invention.

used at a mixing weight ratio A : B : C of 50 : 40 : 10 and molded, as disclosed in the specifications of British Patent Application No. 26835/72 and 28395/72, into a polymer blend film of a thickness of about 200 μ having a laminar structure in which the composition of the copolymer, low density polyethylene and ionomer was different in the direction of the film thickness but it was substantially identical in the plane direction. The so prepared, untreated film was designated as sample BA. This sample BA was heat-treated at 60° C. for 20 minutes to obtain a sample BB, and separately, the sample BA was heat-treated at 80° C. for 20 minutes to obtain a sample BC. The sample BA was heat-treated at 100° C. for 20 minutes to obtain a sample BD. The Sample BA was heat-treated at 105° C. for 20 minutes to obtain a sample BE, and the sample BA was heat-treated at 120° C. for 20 minutes to obtain a sample BF. The sample BA was heat-treated at 100° C. for 5 minutes to obtain a sample EBD and the sample BA was heat-treated at 105° C. for 5 minutes to obtain a sample EBE. Test specimens were sampled from respective samples so that in each specimen the entire thickness direction of the sample was included, and these specimens were subjected to the differential thermal analysis and the oxygen permeability measurement to obtain results shown in Table 6. The ratio Rs of the subsidary endothermic peak area to the main endothermic peak area was determined with respect to the peak area of the ethylene-vinyl alcohol copolymer alone. In case the subsidary endothermic peak area owing to the low density polyethylene or Surlyn ® A appeared in a temperature region approximating the temperature region of the subsidary endothermic peak area owing to the ethylene-vinyl alcohol copolymer, the peak area owing to the copolymer was determined in the following manner.

The low density polyethylene and Surlyn ® A in quite the same amounts as in the above sample were separately heat-treated under respective conditions to determine the endothermic peak areas of the low density polyethylene and ionomer, and these peak areas were reduced from the subsidary endothermic peak of Table 5

| Sample | Heat Treatment Temperature (° C.) | Heat Treatment Time (minutes) | Film Thickness (μ) | Main Endothermic Peak Temperature* (° C.) | Subsidary Endothermic Peak Temperature* (° C.) | Rs (%) | Oxygen Permeability** (cc/m² · day ·atm) |
|---|---|---|---|---|---|---|---|
| W | not heat-treated | 0 | 102 | 151 | none | — | 20.4 |
| X | 70 | 7 | 103 | 151 | 70 | 2.8 | 11.7 |
| Y | 100 | 7 | 103 | 152 | 102 | 3.8 | 8.95 |
| Z | 120 | 7 | 104 | 152 | 129 | 3.4 | 9.37 |
| EY | 100 | 4 | 102 | 151 | 101 | 1.5 | 16.9 |

Notes:
*same as in Table 1
**same as in Table 2

EXAMPLE 6

An ethylene-vinyl alcohol copolymer (A) having the same physical properties as those of the copolymer used in Example 1, a low density polyethylene (B) having a density of 0.924 g/cc (ASTM D-1505) and a melt index of 0.3 g/min (ASTM D-1238) and Surlyn ® A of the Na⁺ ion type (ionomer manufactured by Du Pont) (C) having a density of 0.942 g/cc (ASTM D-1505), a melt index of 1.2 g/min (ASTM D-1248) and a carbonyl concentration of 170 meq/100 g of the polymer were the sample to determine the subsidiary endothermic peak area owing to the ethylene-vinyl alcohol copolymer.

The main endothermic peak temperature of the ethylene-vinyl alcohol copolymer and the subsidary endothermic peak temperature of the copolymer varying depending on the heat treatment temperature were substantially in agreement with those shown in Table 1 within experimental errors.

As is apparent from the results shown in Table 6, the necessary heat treatment time in this Example was a little longer than in the case of samples composed of the ethylene-vinyl alcohol copolymer alone prepared in Examples 1 to 4. It is believed that this is due to the fact that additional heat was used for annealing of crystals of the low density polyethylene and Surlyn ® A.

Table 6

| Sample | Heat Treatment Temperature (° C.) | Heat Treatment Time (minutes) | Rs* (%) | Oxygen Permeability** (cc/m².day.atm·200 μ) | Remarks |
|---|---|---|---|---|---|
| BA | not heat-treated | 0 | 0 | 1.47 | |
| BB | 60 | 20 | 2.9 | 1.05 | |
| BC | 80 | 20 | 3.2 | 0.86 | |
| BD | 100 | 20 | 5.1 | 0.69 | |
| EBD | 100 | 5 | 1 | 1.39 | |
| BE | 105 | 20 | 5.2 | 0.68 | |
| EBE | 105 | 5 | 1 | 1.40 | |
| BF | 120 | 20 | 4.2 | — | shrinks were formed by heat treatment |

Notes:
*same as in Table 1
**same as in Table 4

EXAMPLE 7

A sandwich structure laminate film having a thickness of about 150 μ was prepared according to the multilayer inflation molding method by using as an intermediate film a blend film (A) composed of the same ethylene-vinyl alcohol copolymer, low density polyethylene and Surlyn ® A as used in Example 6 at a weight ratio of 5 : 4 : 1 and as outer and inner layer films (B) the same low density polyethylene as used in Example 6. The weight ratio of inner layer B : intermediate layer A : outer layer B was 1 : 1 : 1. The so prepared film was designated as sample LA. The sample LA was heat-treated at 80° C. for 30 minutes to obtain a sample LB, and separately, the sample LA was heat-treated at 100° C. for 30 l minutes to obtain a sample LC. The sample LA was heat-treated at 105° C. for 30 minutes to obtain a sample LD, and the sample LA was heat-treated at 120° C. for 30 minutes to obtain a sample LE. The sample LA was heat-treated at 105° C. for 10 minutes to obtain a sample ELD. These samples were subjected to the differential thermal analysis and the oxygen permeability test to obtain results shown in Table 7.

In Table 7, l the data of the main endothermic peak area and the subsidary endothermic peak area are those of the ethylene-vinyl alcohol copolymer.

In this Example, the differential thermal analysis was conducted in the following manner:

A part of each sample (after the heat treatment in the case of the heat-treated sample) was immersed for 2 to 3 minutes in a tetrahydrofuran organic solvent, and the outer and inner layers were peeled from the specimen and the intermediate layer alone was subjected to the differential thermal analysis. The subsequent treatments were conducted in the same manner as in Example 6.

In each sample, the main endothermic peak temperature of the ethylene-vinyl alcohol copolymer and the subsidary endothermic peak temperature of the ethylene-vinyl alcohol copolymer varying depending on the heat treatment temperature were substantially in agreement with data shown in Table 1 within experimental errors.

Table 7

| Sample | Heat Treatment Temperature (° C.) | Heat Treatment Time (minutes) | Rs* (%) | Oxygen Permeability** (cc/m².day.atm·150 μ) | Remarks |
|---|---|---|---|---|---|
| LA | not heat-treated | 0 | 0 | 5.91 | |
| LB | 80 | 30 | 3.3 | 3.44 | |
| LC | 100 | 30 | 5.2 | 2.70 | |
| LD | 105 | 30 | 5.1 | 2.72 | |
| ELD | 105 | 5 | 1 | 5.82 | |
| LE | 120 | 30 | 4.3 | — | shrinks were formed by heat treatment |

Notes:
*same as in Table 1
**same as in Table 4

EXAMPLE 8

In the same manner as described in Example 6, a blend film of a thickness of about 200 μ having a layer structure in which the polymer composition was different in the direction of the film thickness but substantially identical with the plane direction was prepared by using the same ethylene-vinyl alcohol copolymer (A), low density polyethylene (B) and Surlyn $^R$ A as used in Example 6 at a weight ratio (A/B) : C of (70/30) : 10. This film was designated as sample BG. Samples BH, BI, BJ, BK, BL and EBK were prepared from this sample BG by heat-treating the sample BG under the conditions indicated in Table 8. These samples were subjected to the fifferential thermal analysis, the oxygen permeability measurement and the water vapor permeability measurement according to JIS Z-0208 to obtain results shown in Table 8. The subsidary endothermic peak owing to the ethylene-vinyl alcohol copolymer was determined in the same manner as in Example 6. The main endothermic peak temperature of the ethylene-vinyl alcohol copolymer and the subsidary endothermic peak temperature of the copolymer varying depending on the heat treatment temperature were substantially in agreement with data shown in Table 1 within experimental errors.

Table 8

| Sample | Heat Treatment Temperature (° C.) | Heat Treatment Time (minutes) | Rs (%) | Oxygen Permeability* (cc/m².day.atm·200 μ) | Remarks |
|---|---|---|---|---|---|
| BG | not heat-treated | 0 | 0 | 0.66 | WVTR**= 18.1 |
| BH | 60 | 18 | 2.9 | 0.54 | WVTR**= 15.9 |
| BI | 80 | 18 | 3.1 | 0.50 | |
| BJ | 100 | 18 | 5.1 | 0.39 | WVTR**= 13.4 |
| BK | 105 | 18 | 5.2 | 0.38 | |
| EBK | 105 | 5 | <1 | 0.65 | |
| BL | 120 | 18 | 4.1 | — | shrinks were formed by heat treat- |

Table 8-continued

| Sample | Heat Treatment Temperature (° C.) | Heat Treatment Time (minutes) | Rs (%) | Oxygen Permeability* (cc/m²·day·atm·200 μ) | Remarks |
|---|---|---|---|---|---|
| | | | | | ment |

Notes:
*same as in Table 4
**water vapor permeability (g/m²·day 200 μ) as measured according to JIS Z-0208

For comparison, a film composed of the same ethylene-vinyl alcohol copolymer as used in this Example (composed of 100% of the copolymer) was heat-treaded under the same conditions as in the case of the above sample BG, BH, BK or BL. The so obtained samples SG, SH, SK and SL were subjected to the tensile test at 20° C., a relative humidity of 65 % and a tensile speed of 300 mm/min by using a tensile tester to examine the tensile strength in the extrusion direction. Results are shown in Table 9. Each value shown in Table 9 is a mean value obtained by conducting the test on 10 samples. From the results shown in Table 9, it will readily be understood that in the case of blend films (samples of the B series), the strength at break and elongation at break of samples heat-treated under the conditions specified in this invention (samples BH and BK) were not substantially different from those of the untreated sample (sample BG) and that in the blend films (samples of the B series) the elongation at break was much higher than in films composed singly of the ethylene-vinyl alcohol copolymer (samples of the S series):

Table 9

| Sample | Heat Treatment Temperature (° C.) | Heat Treatment Time (minutes) | Strength at Break (Kg/cm²) | Elongation at Break (%) |
|---|---|---|---|---|
| BG | not heat-treated | 0 | 205 | 850 |
| BH | 60 | 18 | 208 | 850 |
| BK | 105 | 18 | 210 | 850 |
| SG | not heat-treated | 0 | 300 | 200 |
| SH | 60 | 18 | 300 | 200 |
| SK | 105 | 18 | 305 | 170 |
| SL | 120 | 18 | 315 | 100 |

EXAMPLE 9

A flat bottle having a wall of a symmetric three-layer laminate structure was prepared according to the known co-extrusion and blow molding technique by using as an intermediate layer a blend laminate formed from the same ethylene-vinyl alcohol copolymer (A), low density polyethylene (B) and Surlyn ® A (C) at a weight ratio (A/B) : C of (45/55) : 10 in the same manner as in Example 6. The same low density polyethylene as used in Example 6 was used as outer and inner layers of the bottle wall. The average thickness of the wall of the bottle was about 600 μ, and the outer layer : intermediate layer : inner layer thickness ratio was 4.5 : 1 : 4.5. The inner capacity of the bottle was 280 cc. This bottle was designated as sample IF.

Samples LG, LH, LI, LJ and ELI were prepared from this sample LF by heat-treating the sample LF under the conditions indicated in Table 10.

Each sample was subjected to the differential thermal analysis, the oxygen permeability measurement and the water vapor permeability measurement made on the back face portion cut from the sample bottle to obtain results shown in Table 10. The area of the subsidary endothermic peak formed by the heat treatment of the ethylene-vinyl alcohol copolymer was determined in the same manner as described in Example 7.

The main endothermic peak temperature of the ethylene-vinyl alcohol copolymer and the subsidary endothermic peak temperature varying on the heat treatment temperature were substantially in agreement with data shown in Table 1.

Table 10

| Sample | Heat Treatment Temperature (° C.) | Heat Treatment Time (minutes) | Rs (%) | Oxygen Permeability* (cc/m²·day·atm) | Remarks |
|---|---|---|---|---|---|
| LF | not heat-treated | 0 | 0 | 37.2 | WVTR** = 1.25 |
| LG | 80 | 30 | 3.1 | 28.6 | |
| LH | 100 | 30 | 4.8 | 25.2 | |
| LI | 105 | 30 | 4.9 | 25.3 | WVTR** = 1.18 |
| ELI | 105 | 10 | 1 | 36.9 | |
| LJ | 1.20 | 30 | 4.3 | — | bottle was deformed by heat treatment |

Notes:
*the atmosphere of the sample bottle was substituted with nitrogen gas the opening was sealed with a rubber plug and the oxygen permeability was measured according to the method described in the text of the specification
**the water vapor permeability (g/m²·day·600 μ) as measured according to JIS Z-0208

The above laminate bottles LF, LG and LI, samples BB of the same form, thickness and capacity as described above prepared from a resin blend having the same composition as that of the blend used in Example 8, and samples SB of the same form, thickness and capacity as described above prepared from only the ethylene-vinyl alcohol copolymer used in this Example (sample composed of 100% of the ethylene-vinyl alcohol copolymer) were subjected to the falling impact test. More specifically, 5% saline water was filled fully in the sample bottle, and the bottle was capped. Then, the sample bottle was allowed to stand still over 2 days and nights in a cold chamber maintained at − 2° C., and was let fall on a concrete floor from a height of 120 cm so that the bottle portion impinged against the concrete floor. When the sample was not broken, it was let to fall again from the same height. The test was repeated 10 times at most. Ten bottles were tested with respect to one sample. The breakage ratio was calculated according to the following calculation formula:

$$\text{Breakage Ratio (\%)} = 100 \times \left(1 - \frac{\text{number of bottles not broken by 10 times repeation of falling}}{10}\right)$$

Results are shown in Table 11. In the case of laminate bottles (samples LF, LG and LI), no bottle was broken even if the above falling test was repeated 10 times, but in the case of bottles composed only of the ethylene-vinyl alcohol copolymer (samples SBF, SBG and SBI), all the bottles were broken while the falling test was repeated 10 times.

Table 11

| Sample | Heat Treatment Temperature(° C.) | Heat Treatment Time (minutes) | Breakage Ratio (%) |
|---|---|---|---|
| LF | not heat-treated | 0 | 0 |
| LG | 80 | 30 | 0 |
| LI | 105 | 30 | 0 |
| BBF | not heat-treated | 0 | 30 |
| BBG | 80 | 30 | 30 |
| BBI | 105 | 30 | 40 |
| SBF | not heat-treated | 0 | 100 |

Table 11-continued

| Sample | Heat Treatment Temperature(° C.) | Heat Treatment Time (minutes) | Breakage Ratio (%) |
|---|---|---|---|
| SBG | 80 | 30 | 100 |
| SBI | 105 | 30 | 100 |

EXAMPLE 10

A flat bottle having a symmetric three-laminate structure was prepared by using as an intermediate layer the same resin blend as used in Example 6 except that instead of Surlyn® A there was employed an acrylic acid-grafted, partially saponified ethylene-vinyl acetate copolymer (C) having a vinyl acetate content of 20 mole %, an ethylene content of 80 mole %, a degree of saponification of 50%, an acrylic acid grafting ratio of 1 %, a carbonyl concentration of 660 meq/100 g of polymer, a melt index of 15 g/10 min (ASTM D-1238) and a density of 0.96 g/cc and that the ethylene-vinyl alcohol copolymer (A) and low density polyethylene (B) same as used in Example 6 and the above copolymer (C) were blended at the weight ratio (A/B) : C of (45/55) : 10, and by using as the outer and inner layers the same low density polyethylene (B) as used in Example 6. The co-extrusion and blow molding techniques adopted, the form and average thickness of the bottle, the outer layer : intermediate layer : inner layer thickness ratio and the capacity were quite the same as in described in Example 9. The so prepared bottle was designated as sample LM. This sample LM was heat-treated at 80° C. for 30 minutes to obtain a sample LMG. Both the samples were subjected to the differential thermal analysis and the oxygen permeability measurement according to the methods described in the test of the specification to obtain results shown in Table 12. The area of the subsidary endothermic peak of the ethylene-vinyl alcohol copolymer caused by the heat treatment was determined in the same manner as in Example 7.

The main endothermic peak temperature of the ethylene-vinyl alcohol copolymer and the subsidary endothermic peak temperature of the copolymer by the heat treatment were in agreement with data shown in Table 1 within experimental errors ($\pm$ 1° C.).

Table 12

| Sample | Heat Treatment Temperature (° C.) | Heat Treatment Time (minutes) | Rs(%) | Oxygen Permeability (cc/m$^2$·day·atm) |
|---|---|---|---|---|
| LM | not heat-treated | 0 | 0 | 35.5 |
| LMG | 80 | 30 | 3.4 | 26.0 |

These two bottles were subjected to the falling test in the same manner as in Example 9. In each of them, the breakaga ratio was 0%.

EXAMPLE 11

A flat bottle having a symmetric three-laminate structure was prepared by using as an intermediate layer the same resin blend as used in Example 6 except that instead of Surlyn® A there was employed a polyester/-polyether (polybutylene terephthalate/polytetramethylene oxide) block copolymer (C) having a melt flow-initiating temperature of 170° C. (as measured by using a constant pressure extrusion viscometer under a load of 10 Kg), a density of 1.07 g/cc (JIS K-6911) and a carbonyl concentration of 680 meq/100 g of the polymer and that the ethylene-vinyl alcohol copolymer (A) and low density polyethylene (B) same as used in Example 6 and the above block copolymer (C) were blended at the weight ratio (A/B) : C of (45/55) : 10, and by using as the outer and inner layers the same low density polyethylene as used in Example 6. The co-extrusion and blow molding techniques adopted, the form and average thickness of the bottle, the outer layer : intermediate layer : inner layer thickness ratio and the capacity were quite the same as in Example 9. This bottle was designated as sample LT. This sample LT was heat-treated at 80° C. for 30 minutes to obtain a sample LTG. Both the samples were subjected to the differential thermal analysis and the oxygen permeability measurement according to the methods described in the text of the specification to obtain results shown in Table 13. The area of the subsidary endothermic peak formed by the heat treatment of the ethylene-vinyl alcohol copolymer was determined in the same manner as described in Example 7.

The main endothermic peak temperature of the ethylene-vinyl alcohol copolymer and the secondary endothermic peak temperature of the copolymer caused by the heat treatment were in agreement with data shown in Table 1 within experimental errors ($\pm$ 1° C.).

Both the samples were subjected to the falling test in the same manner as described in Example 9. In each of the bottles, the breakage ratio was 0%.

Table 13

| Sample | Heat Treatment Temperature (° C.) | Heat Treatment Time (minutes) | Rs (%) | Oxygen Permeability (cc/m$^2$·day·atm) |
|---|---|---|---|---|
| LT | not heat-treated | 0 | 0 | 38.6 |
| LTG | 80 | 30 | 3.0 | 29.6 |

EXAMPLE 12

A cylindrical bottle having a 4-layer structure was molded according to the known co-extrusion method and blow molding method. More specifically, a blend prepared by blending the same ethylene-vinyl alcohol copolymer (A), low density polyethylene (B) and Surlyn® A (C) as used in Example 6 at a weight ratio (A/B) : C of (70/30) : 10 was used as an intermediate layer, and the same low density polyethylene as used in Example 6 was used as outer and inner layers. A blend prepared by blending as isotactic polypropylene (E) having a melt index of 1.2 g/10 min and a density of 0.90 g/cc and an ethylene-propylene copolymer (F) having a melt index of 0.4 g/10 min at a weight ratio E : F of 80 : 20 ( hereinafter referred to as "polypropylene") was formed into an innermost layer by using another extruder. The inner capacity of the so prepared cylindrical bottle was 500 cc and the average thickness was about 0.8 mm. The outer layer : intermediate layer (blend layer) : inner layer : innermost layer (polypropylene layer) thickness ratio was 3.1 : 1 : 3.0 : 13.5. The so obtained bottle was designated as sample 4LP.

490 cc of city service water was filled in the sample 4LP, and the opening portion of the bottle was heat-sealed with an aluminum foil-laminated film and then capped. The sealed bottle was allowed to stand still in an autoclave maintained at 100° C. and 1.5 Kg/cm$^2$ for 30 minutes. In the sample 4LP subjected to such heat resistance and pressure resistance test, none of deformation, breakage and delamination were observed. The bottle subjected to the above test was designated as sample 4LPJ.

The city service water was removed from the sample 4LPJ and the bottle was dried. Then, the oxygen permeability was measured according to the method described above. Similarly, the untested bottle 4LP was subjected to the oxygen permeability measurement. Results are shown in Table 14.

Further, samples 4LP and 4LPJ were subjected to the differential thermal analysis according to the method described above to obtain results shown in Table 14.

From the results shown in Table 14, it will readily be understood that even by the above-mentioned test, the subsidiary endothermic peak was formed in the ethylene-vinyl alcohol copolymer and the oxygen permeability was reduced.

Table 15

| Sample | Heat Treatment Temperature (° C.) | Heat Treatment Time(minutes) | Main Endothermic Peak Temperature (° C.) | Subsidary Endothermic Peak Temperature (° C.) | Rs(%) | Oxygen Permeability (cc/m$^2$ · day · atm) |
| --- | --- | --- | --- | --- | --- | --- |
| YK | not heat-treated | 0 | 184 | not detected | 0 | 7.35 |
| YKL | 120 | 20 | 184 | 130 | 4.5 | 6.06 |

Table 14

| Sample | Test Temperature (° C.) | Test Time (minutes) | Main Endothermic Peak Temperature (° C.) | Subsidary Endothermic Peak Temperature (° C.) | Rs(%) | Oxygen Permeability (cc/m$^2$ · day · atm) |
| --- | --- | --- | --- | --- | --- | --- |
| 4LP | not tested | 0 | 182 | not detected | 0 | 3.62 |
| 4LPJ | 100 | 30 | 182 | 106 | 4.7 | 2.54 |

EXAMPLE 13

A flat bottle having a symmetric three-layer laminate structure (outer layer : intermediate layer : inner layer thickness ratio = 10 : 1 : 10) was prepared according to the same co-extrusion and blow molding methods as adopted in Example 9. A blend formed by blending an ethylene-vinyl alcohol copolymer (A) having a vinyl alcohol content of 74.3 mole %, a residual vinyl acetate content of 1.0 mole %, an ethylene content of 24.5 mole % and a propylene content of 1.2 mole %, nylon 6 ($C_1$) having a relative viscosity of 3.4 as measured at 20° C. in a 98% sulfuric acid solution containing 10 g/l of the polymer and a carbonyl concentration of 890 meq/100 g of the polymer and the same Surlyn ® A ($C_2$) as used in Example 6 at a weight ratio (A/$C_1$) : $C_2$ of (70/30) : 10 was used as the intermediate layer (the ethylene-vinyl alcohol copolymer (A) being characterized by an intrinsic viscosity of 0.15 l/g, a melt index of 1.07 g/10 min and a density of 1.20 g/cc). A high density polyethylene having a melt index of 0.3 g/10 min (ASTM D-1238) and a density of 0.945 g/cc (ASTM D-1505) was used as outer and inner layers. The form, average thickness and inner capacity of the bottle were the same as in Example 9. This bottle was designated as sample YK.

The sample YK was heat-treated at 120° C. for 20 minutes to obtain a bottle sample YKL. Both the samples were subjected to the differential thermal analysis and the oxygen permeability methods according to the methods described above. Results are shown in Table 15.

Further, these bottles were subjected to the falling test according to the same method as in Example 9. The breakage ratio was 20% in the case of the sample YK and the breakage ratio was 10% in the case of the sample YKL. In 7 bottles among 8 not-broken bottle samples YK and in 4 bottles among 9 not-broken bottle samples YKL there was observed delamination in the laminated interface between the outer layer and intermediate layer or between the intermediate layer and inner layer.

EXAMPLE 14

A cylindrical bottle having a 4-layer laminate structure was prepared according to the method described in Example 12. The same low density polyethylene as used in Example 12 was used for the outer and inner layers, and the same blend as used in Example 12 for the intermediate layer was also used in this Example for the intermediate layer. A polyester resin selected from the following three polyester resins was used for the innermost layer instead of the polypropylene used in Example 12:

(1) Polyethylene terephthalate having a reducing viscosity (specific viscosity/concentration) of 1.32 dl/g as measured at 30° C. in respect to a 1% by weight solution of the polymer in a 50 : 50 (weight ratio) mixed solvent of phenol and tetrachloroethane.

(2) Polybutylene terephthalate (polytetramethylene terephthalate) having a reducing viscosity of 0.95 dl/g as measured under the same conditions as described in (1) above.

(3) Polycarbonate having a reducing viscosity of 0.82 dl/g as measured at 20° C. in respect to a 0.5% by weight solution of the polymer in methylene chloride.

The co-extrusion and blow molding were conducted in the same manner as described in Example 12.

The so formed 3 bottles had a cylindrical form and an inner capacity of about 1000 cc. Each bottle had an average thickness of about 1.4 mm, and the outer layer : intermediate layer : inner layer : innermost layer thickness ratio was 2 : 1 : 2 : 36.

These three bottles were designated as 4LPET (the polyethylene terephthalate was used as the innermost layer), 4LPBT (the polybutylene terephthalate was used as the innermost layer) and 4LPC (the polycarbonate was used as the innermost layer), respectively.

For comparison, a comparative bottle 4LHD was prepared in the same manner as described above except that a high density polyethylene having a melt index of 0.2 g/10 min (ASTM D-1238) and a density of 0.960 g/cc (ASTM D-1505) was used for the innermost layer. The average thickness and thickness ratio of this bottle were the same as described above.

Each of these bottles 4LPT, 4LPBT, 4LPC and 4LHD was filled with 900 cc of city service water, and each bottle was subjected to the heat resistance and pressure resistance test according to the method described in Example 12 under the same test conditions as in Example 12. Test results are shown in Table 16, in which mark "O" means that deformation, breakage or delamination was not caused at all, and mark "X" means that such defect was caused.

Table 16

| Bottle | Deformation | Breakage | Delamination |
|---|---|---|---|
| 4LPET | O | O | O |
| 4LPBT | O | O | O |
| 4LPC | O | O | O |
| 4LHD | X* | O | O |

*expansion of the bottle bottom was extreme and the bottle could not be erected on a desk.

The city service water was removed from the bottles subjected to the above heat resistance and pressure resistance test, and the bottles were dried in vacuo at 25° C. for 7 days. The oxygen permeability was measured according to the method described above with respect to each of these bottles. For comparison, the oxygen permeability was measured with respect to bottles before the heat resistance and pressure resistance test. Results are shown in Table 17.

Further, each bottle was then subjected to the differential thermal analysis. Results are also shown in Table 17.

From the results shown in Table 17, it will readily be understood that the subsidary endothermic peak was formed in the ethylene-vinyl alcohol copolymer and the oxygen permeability was reduced.

Table 17

| Bottle | Test Temperature (° C.) | Test Time (minutes) | Main Endothermic Peak Temperature (° C.) | Subsidiary Endothermic Peak (° C.) | Rs (%) | Oxygen Permeability (cc/m² · day · atm) |
|---|---|---|---|---|---|---|
| 4LPET | not tested | 0 | 182 | not detected | 0 | 3.01 |
| 4LPET | 100 | 30 | 182 | 107 | 4.9 | 2.12 |
| 4LPBT | not tested | 0 | 181 | not detected | 0 | 3.11 |
| 4LPBT | 100 | 30 | 182 | 105 | 4.8 | 2.19 |
| 4LPC | not tested | 0 | 182 | not detected | 0 | 3.50 |
| 4LPC | 100 | 30 | 182 | 106 | 4.7 | 2.40 |
| 4LHD | not tested | 0 | 183 | not detected | 0 | 4.85 |
| 4LHD | 100 | 30 | 182 | 107 | 4.6 | 3.74 |

What is claimed is:

1. A packaging material having an improved gas permeation resistance, which comprises at least one layer composed of (A) an ethylene-vinyl alcohol copolymer having a vinyl alcohol content of 50 to 75 mole % and a residual vinyl ester content of up to 4 mole % based on the sum of the vinyl alcohol and vinyl ester or (B) a blend of said ethylene-vinyl alcohol copolymer with 25 to 150% by weight, based on said copolymer, of at least one thermoplastic polymer selected from the group consisting of polyolefins and carbonyl group-containing polymers, said ethylene-vinyl alcohol copolymer having a main endothermic peak satisfying substantially the following requirement:

$$Y_1 = 1.64X + 68.0$$

wherein $Y_1$ stands for the main endothermic peak temperature (° C.) in the differential thermal analysis, and X stands for the vinyl alcohol content (mole %) in the ethylene-vinyl alcohol copolymer.

and at least one subsidiary endothermic peak satisfying substantially the following requirement:

$$0.67X + 76.7 \geq Y_2 \geq 0.40X + 40.0$$

preferably $$0.67X + 76.7 \geq Y_2 \geq 0.34X + 88.0$$

wherein $Y_2$ stands for the subsidiary endothermic peak temperature (° C.) in the differential thermal analysis, and X is as defined above.

the ratio (Rs) of the subsidiary endothermic peak area to the main endothermic peak area being at least 2.5%.

2. A packaging material as set forth in claim 1 wherein the ethylene-vinyl alcohol copolymer is a saponified product formed by saponifying an ethylene-vinyl acetate copolymer having an ethylene content of 25 to 50 mole % and a vinyl acetate content of 75 to 50 mole % at a degree of saponification of at least 96%.

3. A packaging material as set forth in claim 1 wherein the ethylene-vinyl alcohol copolymer has an intrinsic viscosity of 0.07 to 0.17 l/g as measured in a mixed solvent of 85% by weight of phenol and 15 % by weight of water at 30° C.

4. A packaging material as set forth in claim 1 which has a multi-layer molded structure comprising at least one layer (a) composed of (A) said ethylene-vinyl alcohol copolymer or (B) said blend thereof and at least one layer (b) composed of a thermoplastic copolymer which has a water absorption lower than 3.5%, when it has been allowed to stand in an atmosphere of a temperature of 23° C. and a relative humidity of 50% for 5 days.

5. A packaging material as set forth in claim 4 wherein said layer (b) comprises a polyolefin.

6. A packaging material as set forth in claim 1 which has a multi-layer molded structure comprising an outer surface layer of a polyolefin, an intermediate layer composed of a blend containing said ethylene-vinyl alcohol copolymer (EV), a polyolefin (PO) and a carbonyl group-containing thermoplastic polymer (C) at a weight ratio EV : PO : C of from 100 : 25 : 4 to 100 : 100 : 20, and an inner surface layer of a polyolefin.

7. A packaging material as set forth in claim 6 wherein a heat-resistant and pressure-resistant innermost layer composed of a thermoplastic resin is formed inside the inner surface layer, said thermoplastic resin of the innermost layer being selected from the group consisting of (i) polyesters, (ii) polypropylenes, (iii) polycarbonates, (iv) methyl methacrylate-grafted acrylonitrile-styrene copolymers, methyl methacrylate-grafted acrylonitrile-butadiene copolymers and methyl methacrylate-grafted acrylonitrile-styrene-butadiene copolymers, (v) acrylonitrile-styrene-butadiene copolymers and (vi) polymethyl methacrylate.

8. A packaging material as set forth in claim 1 which is a bottle formed by blow molding.

9. A packaging material as set forth in claim 1 which is a film.

10. A process for the preparation of packaging materials which comprises the steps of (1) forming a molded structure comprising at least one layer composed of (A) an ethylene-vinyl alcohol copolymer having a vinyl alcohol content of 50 to 75 mole % and a residual vinyl ester content of up to 4 mole % based on the sum of the vinyl alcohol and vinyl ester or (B) a blend of said copolymer with 25 to 150% by weight, based on said copolymer, of at least one thermoplastic polymer selected from the group consisting of polyolefins and carbonyl group-containing polymers, and (2) maintaining the so formed structure under temperature and time conditions satisfying the following requirements:

$$0.67X + 66.7 \geq Y_3 \geq 0.40X + 30.0$$

preferably $$0.67X + 66.7 \geq Y_3 \geq 0.34X + 78.0$$

wherein $Y_3$ stands for the heat treatment temperature (° C.) and X stands for the vinyl alcohol content (mole %) in the ethylene-vinyl alcohol copolymer, and $$t \geq 0.5X - 20$$

wherein $t$ stands for the heat treatment time (minute) and X is as defined above.

11. A process according to claim 10 wherein the molded structure is one formed by melt molding.

12. A packaged foodstuff comprising a packaging material as set forth in claim 1 and a foodstuff filled in said packaging material.

13. A packaging material as set forth in claim 1 wherein said polyolefin is one selected from the group consisting of polyethylene and polypropylene.

14. A packaging material as set forth in claim 1 wherein said carbonyl group-containing polymer has a carbonyl group at a concentration of 120 to 1400 meq/100 g of the polymer.

* * * * *